United States Patent
List et al.

(10) Patent No.: US 9,481,127 B2
(45) Date of Patent: *Nov. 1, 2016

(54) METHOD FOR PRODUCING A CONNECTION BETWEEN COMPOSITE PARTS

(71) Applicant: FOKKER AEROSTRUCTURES B.V., Papendrecht (NL)

(72) Inventors: Joost List, Seattle, WA (US); Robert Kruithof, Mukilteo, WA (US); Johannes Martinus Josephus Teunissen, Hoogeveen (NL); Hendrik Van Croonenborg, Hoeven (NL)

(73) Assignee: FOKKER AEROSTRUCTURES B.V., Papendrecht (NL)

( * ) Notice: Subject to any disclaimer, the term of this patent is extended or adjusted under 35 U.S.C. 154(b) by 539 days.

This patent is subject to a terminal disclaimer.

(21) Appl. No.: 13/661,220

(22) Filed: Oct. 26, 2012

(65) Prior Publication Data

US 2013/0052407 A1 Feb. 28, 2013

Related U.S. Application Data

(63) Continuation of application No. 12/572,697, filed as application No. PCT/NL2008/050186 on Apr. 3, 2008, now Pat. No. 8,318,068.

(30) Foreign Application Priority Data

Apr. 3, 2007 (NL) ...................................... 2000570

(51) Int. Cl.
*B29C 65/02* (2006.01)
*B29C 65/42* (2006.01)
(Continued)

(52) U.S. Cl.
CPC ............... *B29C 65/02* (2013.01); *B29C 65/42* (2013.01); *B29C 65/4815* (2013.01);
(Continued)

(58) Field of Classification Search
None
See application file for complete search history.

(56) References Cited

U.S. PATENT DOCUMENTS 2,392,734 A 1/1946 Haberstump
3,035,956 A 5/1962 Gonda et al.
(Continued)

FOREIGN PATENT DOCUMENTS

DE 103 42 921 4/2005
JP 61053026 3/1986
(Continued)

OTHER PUBLICATIONS

Val Kagan et al., "The Effects of Weld Geometry and Glass-fiber Orientation on the Mechanical performance of Joints Part I: Weld Design Issues" Journal of Reinforced Plastics and Composite, Technomic Publishing Lancaster, PA, US, vol. 23, No. 2, 2004, XP007901643, ISSN: 0731-6844. pp. 167-175.
(Continued)

*Primary Examiner* — Edmund Lee
(74) *Attorney, Agent, or Firm* — Young & Thompson

(57) ABSTRACT

A method for joining together constructional parts which are made of a composite material and extend transversely to one another, such as a flange and a web of a profile, includes the steps of:
placing the constructional parts in the desired position with respect to one another so as to form a connecting region in which one of the constructional parts abuts against or in proximity to the other constructional part,
causing a thermoplastic material to flow out into the connecting region,
fusing together the constructional parts under the influence of heat and pressure.

17 Claims, 4 Drawing Sheets

(51) Int. Cl.
  *B29C 65/00* (2006.01)
  *B29C 65/48* (2006.01)
  *B29K 71/00* (2006.01)
  *B29K 105/06* (2006.01)
  *B29K 105/12* (2006.01)
  *B29L 31/00* (2006.01)

(52) U.S. Cl.
  CPC .......... *B29C 66/112* (2013.01); *B29C 66/114* (2013.01); *B29C 66/301* (2013.01); *B29C 66/43441* (2013.01); *B29C 66/532* (2013.01); *B29C 66/721* (2013.01); *B29C 66/7392* (2013.01); *B29C 65/488* (2013.01); *B29C 66/71* (2013.01); *B29C 66/7212* (2013.01); *B29C 66/72143* (2013.01); *B29K 2071/00* (2013.01); *B29K 2105/06* (2013.01); *B29K 2105/12* (2013.01); *B29L 2031/003* (2013.01); *Y10T 428/19* (2015.01); *Y10T 428/24* (2015.01); *Y10T 428/24174* (2015.01)

(56) References Cited

U.S. PATENT DOCUMENTS

| | | |
|---|---|---|
| 3,893,777 A | 7/1975 | Jones |
| 4,261,947 A | 4/1981 | Ogi |
| 5,244,876 A | 9/1993 | Preisler et al. |
| 5,603,747 A | 2/1997 | Matuda et al. |
| 6,849,150 B1 | 2/2005 | Schmidt |
| 7,708,923 B1 | 5/2010 | Helicke et al. |
| 2003/0006524 A1 | 1/2003 | Reynolds |
| 2005/0230025 A1 | 10/2005 | Bates et al. |

FOREIGN PATENT DOCUMENTS

| | | |
|---|---|---|
| JP | 03-297629 | 12/1991 |
| WO | 9000111 | 1/1990 |

OTHER PUBLICATIONS

Shvarts et al., "Reprocessing of Plastic Materials", St. Petersburg Professija Publishing House, pp. 260-261, 264-265.

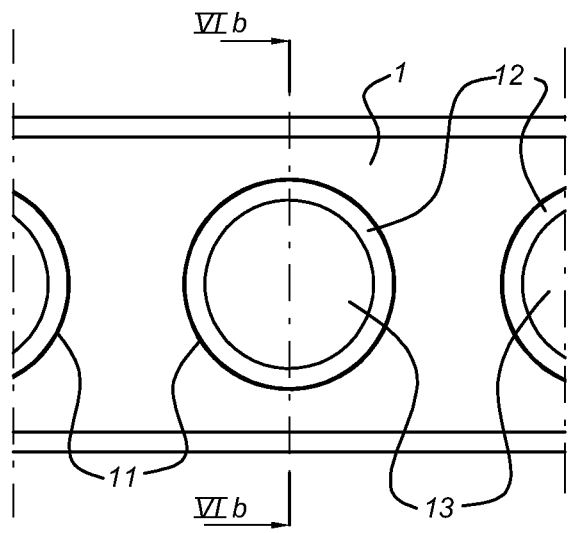
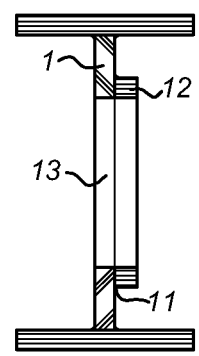
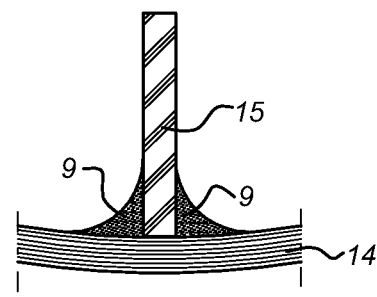
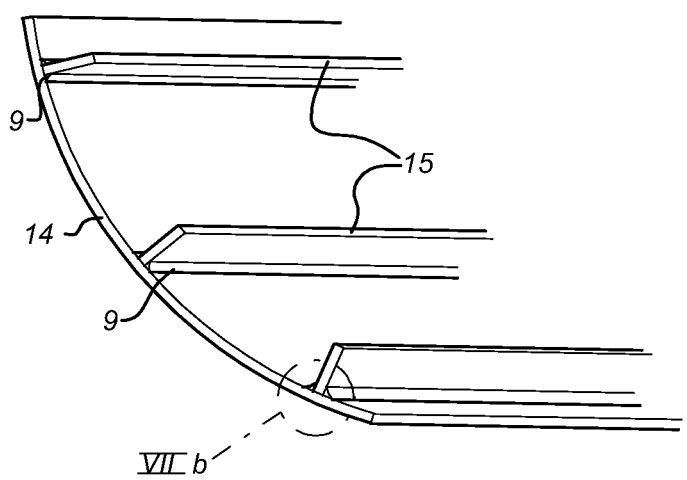

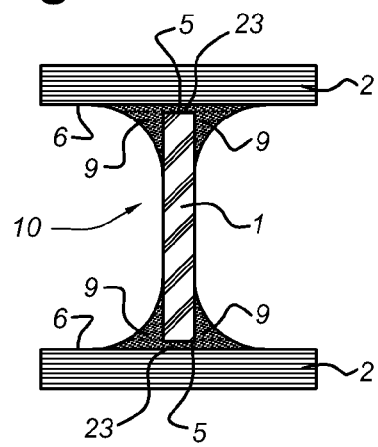
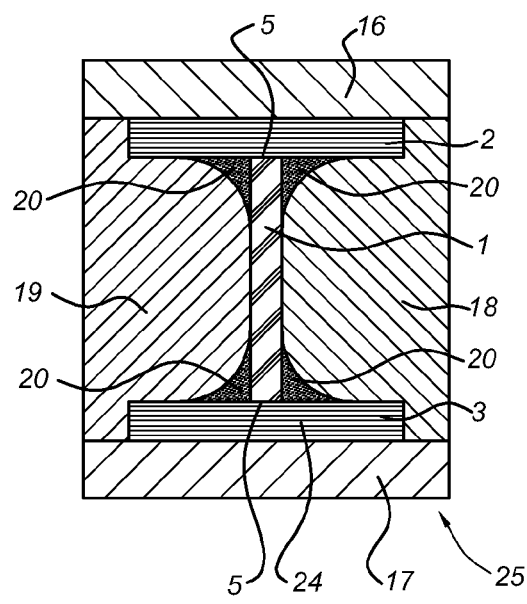
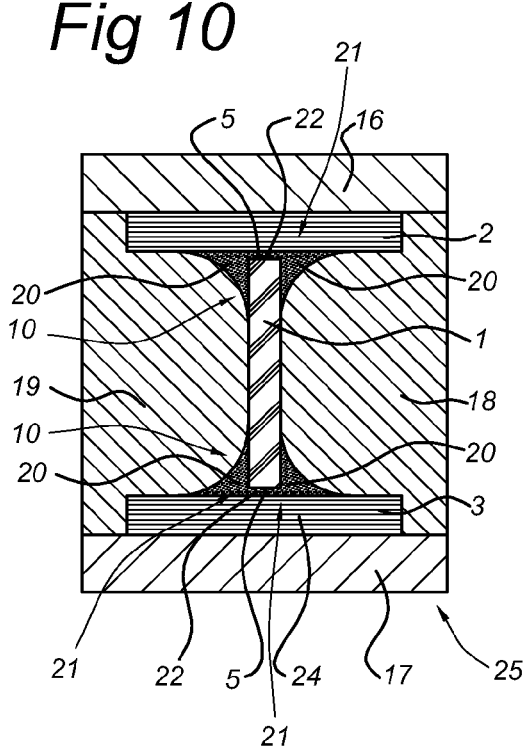

METHOD FOR PRODUCING A CONNECTION BETWEEN COMPOSITE PARTS

CROSS REFERENCE TO RELATED APPLICATIONS

This application is a continuation of application Ser. No. 12/572,697 filed on Oct. 2, 2009 now U.S. Pat. No. 8,318,068; which is the 35 U.S.C. 371 national stage of International application PCT/NL08/050186 filed on Apr. 3, 2008; which claims priority to Netherlands application 2000570 filed on Apr. 3, 2007. The entire contents of each of the above-identified applications are hereby incorporated by reference.

BACKGROUND OF THE INVENTION

The invention relates to a method for joining together parts made of a composite material. Parts of this type consist of one or more layers of fibers embedded in a matrix made of plastics materials. The plastics material matrix may be a thermoplastic or a thermoset; the choice of the plastics material matrix is usually determined by the properties which the finished product is required to have.

DESCRIPTION OF THE RELATED ART

In a conventional manner of joining together two parts made of composite material, the parts are placed flat against one another. Subsequently, the thermoplastic matrix is melted under the influence of heat, after which the parts are fastened to one another under pressure by local fusion. In such a manner of fastening, a flange is usually formed on one or both parts, at the location of which flange or flanges the connection is then produced. Examples include the joining of a web plate provided with flanges to two accompanying purlins so as to form an I-shaped beam.

However, producing a connection between two composite parts in this way is not without its drawbacks. Firstly, the presence of one or more flanges on one of the composite parts, intended to produce the connection, can be problematic. Although a flange shaped in this way is readily possible in the case of a composite part which is otherwise flat, in the case of non-flat composite parts, such as an undulatory web for an I-shaped beam, shaping a flange is awkward, since this would also impart a non-flat shape to the bend line. The attachment of a flange by bending with respect to a non-straight bend line is, however, rendered difficult as a result of the fact that the deformation associated therewith causes high stresses in the plane of the flange and the web. A further drawback is that the flanges in the finished construction do not always contribute efficiently to the overall strength and rigidity properties. Although they do ensure the necessary connection between the web and purlins, this does not always lead to an effective contribution in the aforementioned properties.

In certain cases, the additional weight associated with flange connections of this type can be a drawback. This is relevant, in particular, in applications in aviation and space travel. Often the flanges are formed by extending the layers of fiber material continuously into the flange or flanges. If there is a specific prescribed minimum thickness of the flanges, the remainder of the respective composite part must then also have a specific layer thickness, and this is not always necessary for reasons of rigidity and strength.

SUMMARY OF THE INVENTION

The object of the invention is therefore to provide a method for joining together composite parts that does not have these drawbacks. That object is achieved by means of a method for joining together constructional parts which are made of a composite material and extend transversely to one another, such as a flange and a web of a profile, including the steps of:

placing the constructional parts in the desired position with respect to one another so as to form a connecting region in which one of the constructional parts abuts against or in proximity to the other constructional part, causing a thermoplastic material to flow out into the connecting region, fusing together the constructional parts under the influence of heat and pressure.

According to the invention, the use of connecting flanges is dispensed with when producing a connection between two composite parts. Instead, a thermoplastic material, which after melting under the influence of heat and pressure forms the complete connection, is allowed to flow out between the abutting edge of one of the composite parts and the directly opposing face of the other composite part. This is possible because the properties of the connection are dictated by the thermoplastic without the layers of fibers proving to be the decisive factor in this regard. This finding therefore allows the production, using less material, namely without the hitherto conventional flanges, of a connection which meets the requirements placed on strength and rigidity.

The thermoplastic material which is allowed to flow out can, for example, derive from the parts to be joined together themselves. Under the influence of heat, the thermoplastic material of the parts becomes fluid in such a way that said thermoplastic material flows out under pressure into the connecting region. Since the amount obtained in this way of thermoplastic material in the connecting region is limited, this variation of the method is particularly suitable for constructions which are subject to relatively light loads. In addition, or alternatively thereto, additional thermoplastic material can be added to the connecting region. The connection is then produced using a relatively large amount of thermoplastic material, so connections produced in this way using additional thermoplastic material are suitable for constructions which are subject to heavier loads.

The connections obtained in this way must be able to meet various requirements. A distinction must be drawn in this regard between the requirement of strength and the requirement of rigidity. The first requirement is critical if the connection must be able to withstand maximum loads. In the case of a conventional connection, the shearing force from the web plate is transferred over a broad width, as determined by the width of the flange or flanges, onto the surface of the purlin (in the case of an I-shaped beam or T-shaped beam). In the case of a product produced using the present method, this width is considerably lower and is limited to the width of the bead made of thermoplastic material.

The method according to the invention may, in particular, include the steps of:

forming a bead from thermoplastic material, causing the width of the bead to increase, starting from the abutting leading edge of one constructional part toward the opposing surface of the other constructional part.

A method of this type is particularly suitable for stiffeners which are attached to floor joists and for annular stiffeners on web plates.

For constructional parts which are subject to relatively high loads, the leading edge of one constructional part can also be widened. This increases the boundary surface area between the web plate and the purlin. The advantage of this is that, for otherwise equal shearing forces, the shear stress in the boundary surface can remain lower.

In particular, this can involve carrying out the steps of:
splitting the leading edge of one constructional part so as to form two legs enclosing a longitudinal cavity,
filling the longitudinal cavity with thermoplastic material.

The thermoplastic material in the longitudinal cavity is preferably filled with fibers, for example to an amount of 60%. This improves the stability of the filling material in the longitudinal cavity, yielding a stabler construction.

The stability can further be improved by the step of:
causing the width of the bead to increase from approximately the width of the leading edge of one constructional part to at most five times said width on the surface of the other constructional part. In particular, the width of the bead can be caused to increase to at most three times the width of the leading edge of one constructional part.

Another possible embodiment of the method according to the invention includes the steps of:
placing the leading edge of one constructional part against the other constructional part,
attaching thermoplastic material to the outside of both constructional parts in the connecting region.

In this method, there is therefore no need to remove the leading edge of the respective constructional part. The original leading edge is placed directly against or almost against the other constructional part. The beads of thermoplastic material on either side of the leading edge ensure effective transmission of force in this embodiment.

The thermoplastic material used in the connecting region is preferably PEI, PEKK or PEEK.

A fiber-reinforced composite material can be used in the method according to the invention. Various materials can be used as the fiber reinforcement; examples include metal-reinforced composite material, or composite material impregnated with PEI, PEKK or PEEK.

The method according to the invention can be carried out in various ways. According to a preferable option, the method according to the invention includes the steps of:
placing the constructional parts into a mould,
causing the thermoplastic material to melt in the mould under pressure and heat.

As stated hereinbefore, in the case of specific constructions which are subject to relatively heavy loads, the connection between the constructional parts can be obtained by adding thermoplastic material. This can be achieved, in particular, by introducing that thermoplastic material in the form of a filling element. The filling element can be pre-produced, for example by means of extrusion or pressing, and be positioned at the desired location in the connecting region. This can involve, for example, applying two filling elements on either side of an abutting constructional part. According to still another option, one or more filling elements can be applied on either side of the abutting constructional part and between that abutting constructional part and the other constructional part. The filling element can consist of a thermoplastic material which is filled with relatively short reinforcing fibers.

To ensure a good connection, use is made in the connecting region of a thermoplastic material which is similar to the thermoplastic material of the composite material of the constructional parts. The method according to the invention also includes the fusing under the influence of heat and pressure of the constructional parts in their entirety.

The mould which is used in this case follows closely the contours of the products to be produced. The overall assembly consisting of the mould and the workpiece, which is enclosed therein and comprises constructional parts consisting of composite and, if appropriate, filling elements, is placed into an autoclave. In the autoclave the assembly as a whole is exposed to heat and excess pressure. The thermoplastic material of the composite parts and of any filling elements melts in this case completely, thus totally fusing said components.

The invention further relates to a construction produced using the method as described hereinbefore. This construction comprises at least two constructional parts which are directed transversely to one another in such a way that the leading edge of one of the constructional parts abuts against or in proximity to a surface of the other constructional part so as to form a connecting region, and also a connection which is made of thermoplastic material which is located in that connecting region. This may be a T-shaped profile, an I-shaped profile and the like.

BRIEF DESCRIPTION OF THE DRAWINGS

The invention will be described hereinafter in greater detail with reference to a few exemplary embodiments illustrated in the figures, in which:

FIGS. 4-8 show further variations;

FIG. 9 shows the mould pertaining to the variation from FIG. 4;

FIG. 10 shows the mould pertaining to the variation from FIG. 8;

FIG. 12 shows the mould pertaining to the shell plate from FIG. 7a.

Figure 1:
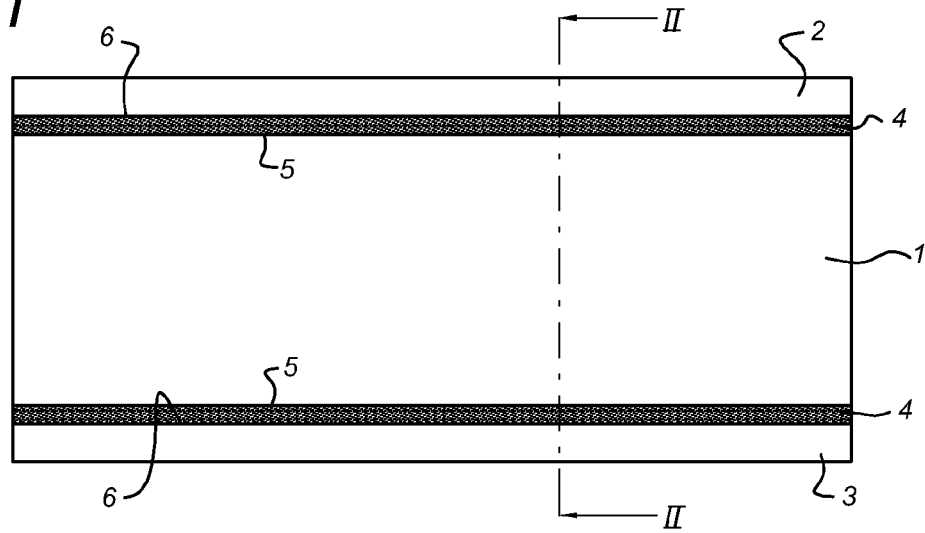
FIG. 1 is a side view of an I-shaped beam according to the invention.
Figure 2:
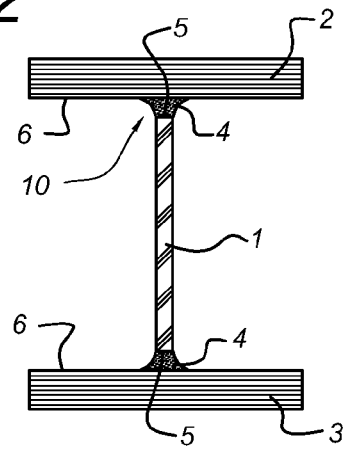
FIG. 2 is a cross section taken along the line II-II from FIG. 1.

The I-shaped beam shown in FIGS. 1 and 2 according to the invention consists of a web plate 1, an upper purlin 2 and a lower purlin 3. These purlins 2, 3 are joined together by means of the weld beads 4. In the exemplary embodiment shown, these weld beads 4 extend from the leading edge 5 of the web plate 1 up to the surface 6 of the purlins 2, 3 that faces said leading edge. In the connecting region 10 thus determined, the width of the weld beads increases from the thickness of the web plate 1 to three to five times said thickness at the location of the surface 6 of the purlins 2, 3. This provides good attachment, with relatively low shear stresses, to the purlins 2, 3. This variation is typical of that embodiment of the method according to the invention in which a relatively small amount of thermoplastic material is obtained in the weld bead as a result of thermoplastic material flowing out of the web plate and purlins. In view of the narrow connecting regions thus obtained, a construction of this type is particularly suitable for relatively light loads.

Figure 3:
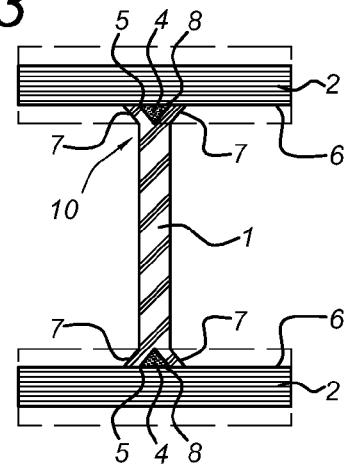
FIG. 3 shows a variation of the leading-end connection between the constructional parts.

This also applies to the variation from FIG. 3. In this case, the leading edge 5 of the web plate 1 has been removed so as to form two legs 7 enclosing a longitudinal cavity 8. This longitudinal cavity is filled with outflowing thermoplastic material. A relatively large attachment surface area between the leading edge 5 of the web plate 1 and the surface 6 of the purlin 2 can in this way too be obtained in the connecting region 10. The unobstructed continuation of the web plate 1, via the split legs 7 thereof, up to the purlin 2 ensures that a strong, rigid connection is obtained. The low shearing stresses, resulting from the wide nature of the leading edge 5, at the location of the attachment to the purlin also prevent excessive loading of the thermoplastic material.

Figure 4:
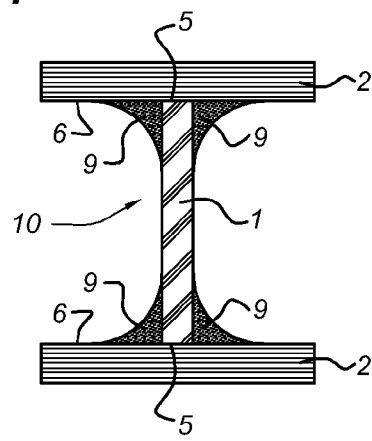

The variation from FIG. 4 shows an I-shaped beam from which the leading edge 5 of the web plate 1 has not been widened. The web plate 1 extends right up to the purlins 2 in such a way that the leading edges 5 thereof rest almost or entirely against the surface 6 of the purlins 2. Weld beads 9, which are obtained by adding additional thermoplastic material (see below and FIG. 9), are applied on either side of the connecting region 10 thus formed. This provides weld beads 9 having a relatively large cross section, so a connection of this type is particularly suitable for constructions subject to relatively heavy loads.

Figure 5:
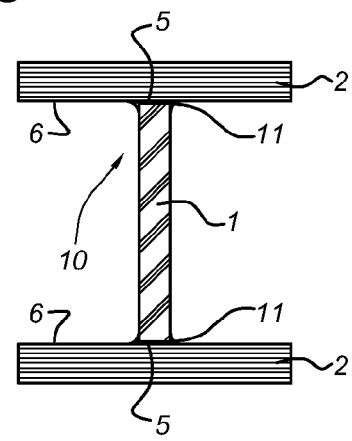

FIG. 5 shows a connection corresponding to that of FIG. 4, although in this case no additional thermoplastic material has been added. As a result, the weld beads 11 are considerably smaller than that according to the variation from FIG. 4. After all, the weld beads 11 are obtained as a result of the outflow of the thermoplastic material of the purlin 1 and the flange 2 itself, so this construction is particularly suitable for relatively light loads.

The variation from FIGS. 6a and 6b relates to a joist, the web plate 1 of which has openings 13 which are reinforced by means of cylindrical flanges 12. The cylindrical flanges 12 are fastened to the web plate 1 by means of the weld beads 11 which can also be obtained by mere outflow of the thermoplastic material of the web plate 1 and of the cylindrical flange 12. In addition, additional thermoplastic material can also be added so as to obtain a thicker weld bead and thus a connection which is able to withstand heavier loads.

The variation from FIGS. 7a and 7b relates to a rigidified panel having a shell plate 14 to which stiffeners 15 are fastened. The weld beads 9 are obtained by adding additional thermoplastic material (see below and FIGS. 11 and 12) because a shell plate 14 of this type may be a constructional component which is subject to relatively high loads.

FIG. 8 shows a variation of an I-shaped beam, the flanges 2, 3 of which are fastened in a manner different to the variation from FIG. 4. Between the leading edges 5 on the upper side and underside of the web plate 1 and the top and bottom purlins 2, 3 there are now spaces which are filled with thermoplastic material 23. This thermoplastic material 23 forms a single entity with the weld beads 9 located on either side of the leading edge.

FIG. 9 illustrates the manner in which the I-shaped beam according to FIG. 4 is produced with the aid of the mould 25. The mould 25 consists of the top and bottom mould plates 16, 17 and also the left-hand and right-hand mould pieces 19, 18. These mould plates and mould pieces enclose a forming cavity 24 which has the contour of the final I-shaped beam according to FIG. 4. As is shown, the forming cavity 24 receives the lower purlin 3, the web plate 1 and the upper purlin 2. Filling elements 20, which are extruded or pressed in such a way that they closely follow the contour of the mould pieces 19, 18 and of the purlins 2, 3 and web plate 1, are also received at the location of the corners between the purlins 2, 3 and the web plate 1.

The overall assembly consisting of the mould 25, the purlins 2, 3, the web plate 1 and the filling elements 20 is placed into an autoclave and subjected to heat and pressure. This causes the thermoplastic material of the purlins 2, 3, the web plate 1 and of the filling elements 20 to melt. The thermoplastic material of said components blends in such a way that after cooling the finished I-shaped beam according to FIG. 4 is obtained.

FIG. 10 also illustrates the mould 25, although as used in the production of the I-shaped beam according to FIG. 8. The course of events in the production of this I-shaped beam corresponds broadly to that of FIGS. 4 and 9. In this case, filling elements 21, consisting of the filling elements 20 as used in the variation from FIG. 8 and also the bridges 22, are however attached at the location of the top and bottom leading edges 5 of the web plate 1. These filling elements 20 and bridges 22 form both at the top and at the bottom a single entity which can be obtained, for example, by means of extruding or pressing. The top and bottom leading edges 5 of the web plate 1 are thus set apart from the opposing surfaces 6 of the top and bottom purlins 2, 3. The I-shaped beam according to FIG. 8 is thus obtained when the mould 25 is subjected to excess pressure and heated, as shown in FIG. 10.

Figure 11:
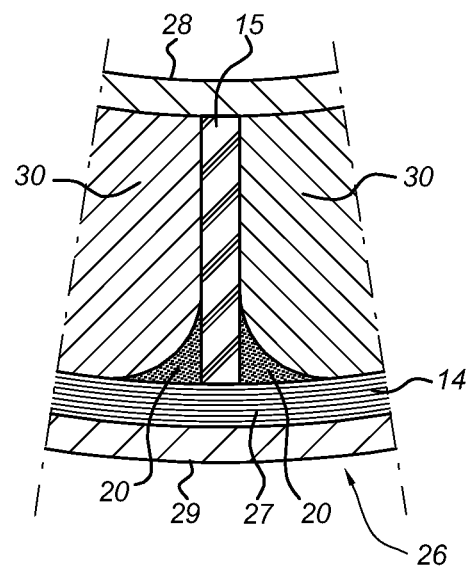
FIG. 11 shows the mould pertaining to the detail from FIG. 7b.
Figure 12:
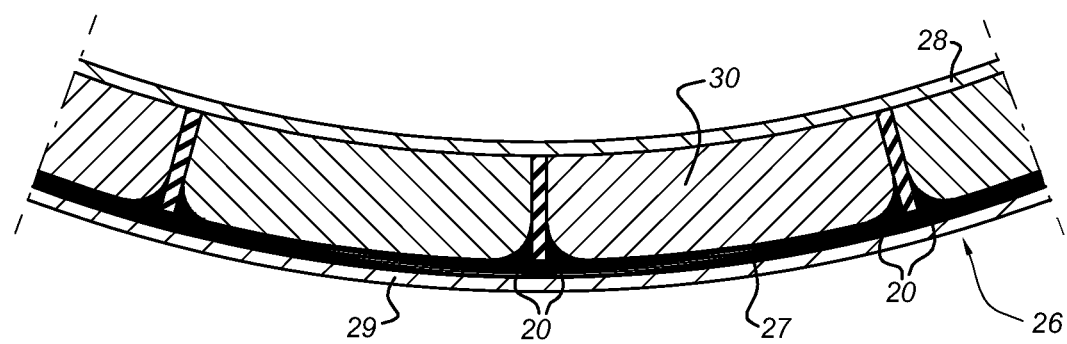

FIGS. 11 and 12 show the mould 26 comprising the forming cavity 27 which is used for producing the rigidified panel according to FIG. 7a, b. This mould 26 consists of the top mould plate 28 and the bottom mould plate 29 and also of the mould pieces 30. The shell plate 14 and also a stiffener 15 comprising filling elements 20 is received between each two mould pieces 30, the mould plate 28 and the mould plate 29. The rigidified panel according to FIGS. 7a, b is thus obtained under the influence of heat and pressure, as supplied in an autoclave.

The above-described connections can be used in all types of constructions and in particular in girders for use in aviation and in space travel. Examples of applications of this type include the supporting beams as used in the floor of a cockpit.

LIST OF REFERENCE NUMBERS

1. Web plate
2. Purlin
3. Purlin
4. Weld bead
5. Leading edge of the web plate
6. Surface of the purlin
7. Leg of the web plate
8. Longitudinal cavity in the web plate
9. Weld bead
10. Connecting region
11. Weld bead
12. Cylindrical flange
13. Opening in the web plate
14. Shell plate
15. Stiffener
16., 17. Mould plate
18., 19. Mould piece
20. Filling element
21. Filling element
22. Bridge
23. Thermoplastic material filling
24., 27. Forming cavity
25., 26. Mould
28., 29. Mould plate
30. Mould piece

The invention claimed is:

1. A method for joining together constructional parts which are made of a composite material consisting of fibers and thermoplastic material, and extend transversely to one another, including the steps of:

placing the constructional parts of a workpiece to be made into a mould and in a desired position with respect to one another so as to form a connecting region in which a leading edge of one of the constructional parts abuts against or in proximity to a surface of the other constructional part;

placing the mould and the workpiece under excess pressure and elevated temperature;

causing the thermoplastic material of the workpiece to melt completely and form molten thermoplastic material; and causing the molten thermoplastic material to flow out into the connecting region, fusing together the constructional parts under the influence of heat and pressure, including the fusing under the influence of heat and pressure of the constructional parts in their entirety, allowing the thermoplastic material to flow out between the abutting edge of one of the constructional parts and the directly opposing face of the other constructional part, and forming a connection located in the connecting region, which connection comprises the thermoplastic material, the connection being located between the abutting leading edge of the one constructional part and the surface of the other constructional part.

2. The method as claimed in claim 1, including the further steps of:
   forming a bead from thermoplastic material, and
   causing the width of the bead to increase, starting from the leading edge, abutting at a certain distance in proximity to the opposing constructional part, of one constructional part toward the opposing surface of that opposing constructional part.

3. The method as claimed in claim 1, including the further step of:
   widening the leading edge of one constructional part.

4. The method as claimed in claim 1, including the further steps of:
   splitting the leading edge of one constructional part so as to form two legs enclosing a longitudinal cavity, and
   filling the longitudinal cavity with thermoplastic material.

5. The method as claimed in claim 4, including the further step of:
   filling the thermoplastic material in the connecting region with fibers.

6. The method as claimed in claim 4, including the further step of:
   placing both legs of one constructional part against the other constructional part.

7. The method as claimed in claim 2, including the further step of:
   causing the width of the bead to increase from approximately the width of the leading edge of one constructional part to at most five times said width on the surface of the other constructional part.

8. The method as claimed in claim 1, including the further steps of:
   placing the leading edge of one constructional part against the other constructional part, and
   applying thermoplastic material to the outside of both constructional parts in the connecting region.

9. The method as claimed in claim 1, including the use of PEI, PEKK or PEEK as the thermoplastic material in the connecting region.

10. The method as claimed in claim 9, wherein the thermoplastic material is filled with fibers.

11. The method as claimed in claim 10, wherein the fibers are selected from the group consisting of carbon fibers and glass fibers.

12. The method as claimed in claim 1, including the further step of:
    applying additional thermoplastic material in the connecting region.

13. The method as claimed in claim 12, including the further step of:
    applying additional thermoplastic material in the form of at least one filling element.

14. The method as claimed in claim 13, including the further steps of:
    applying filling elements on either side of the abutting constructional part.

15. The method as claimed in claim 13, further including application of one or more filling elements on either side of the abutting constructional part and between that abutting constructional part and the other constructional part.

16. The method as claimed in claim 15, further including application of a filling element comprising two relatively thick halves and also a relatively thin bridge joining the halves together.

17. The method as claimed in claim 13, further including application of a filling element consisting of a thermoplastic material which is filled with relatively short reinforcing fibers.

* * * * *